April 1, 1941.　　　D. F. SPROUL　　　2,236,550
FRICTION SPRING UNIT
Filed Feb. 17, 1939　　2 Sheets-Sheet 1
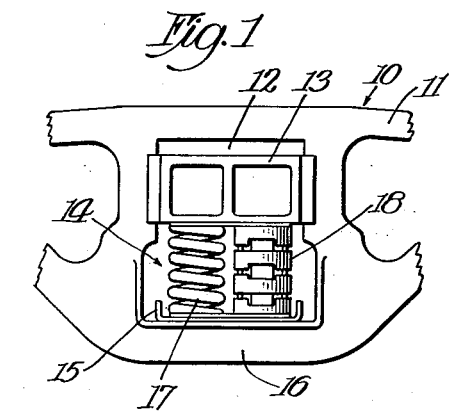
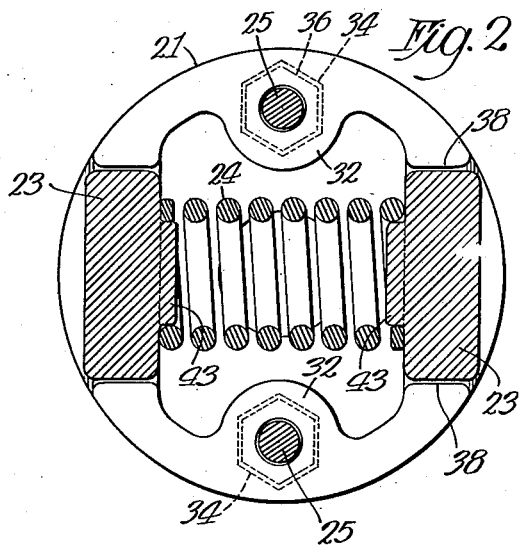
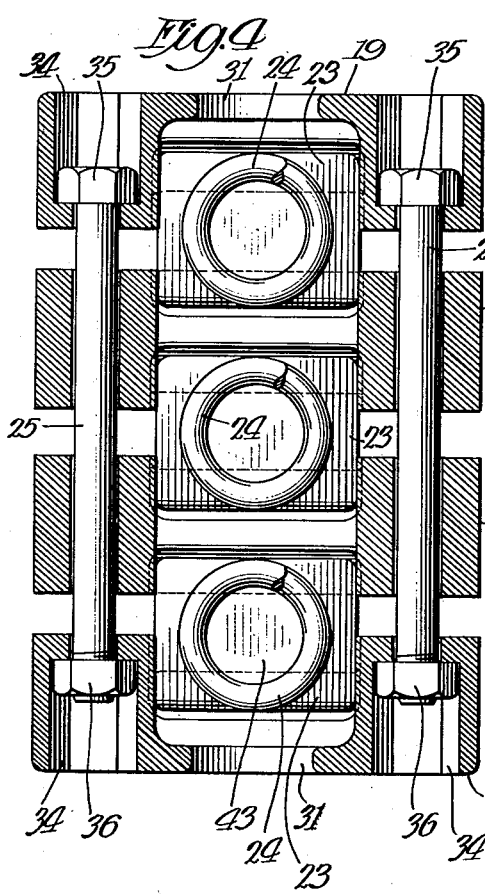
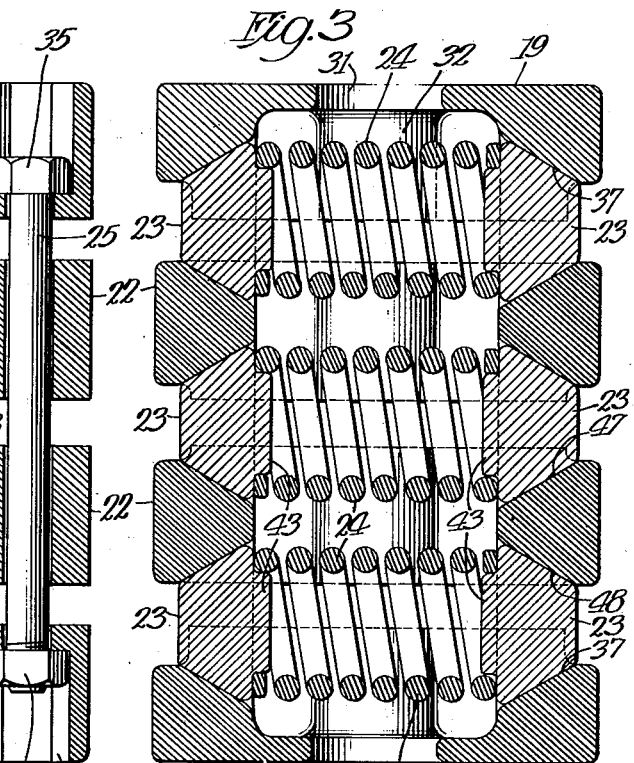
Inventor:
Donald F. Sproul
By Mann, Brown & Cox
Attys.

April 1, 1941.　　　D. F. SPROUL　　　2,236,550
FRICTION SPRING UNIT
Filed Feb. 17, 1939　　　2 Sheets-Sheet 2
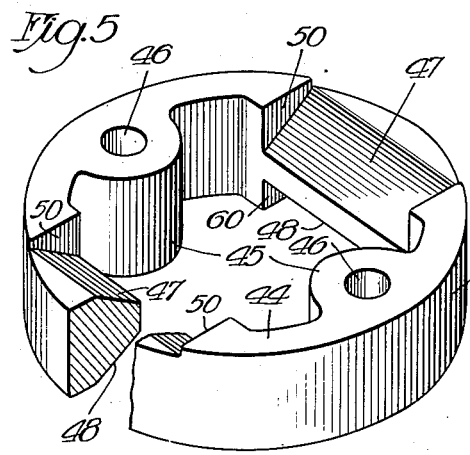
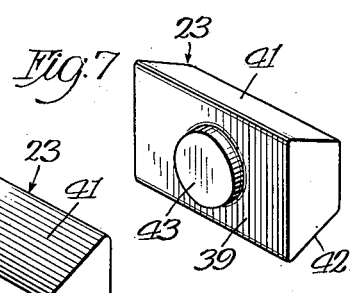
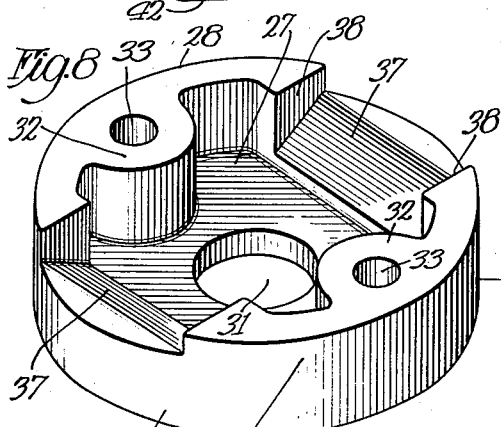
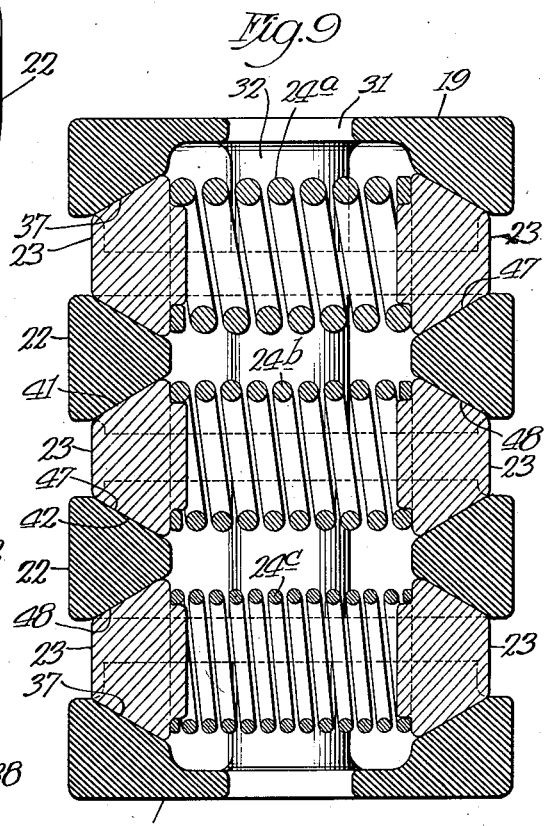
Inventor:
Donald F. Sproul
By Mann, Brown &c.
Attys.

Patented Apr. 1, 1941

2,236,550

UNITED STATES PATENT OFFICE 2,236,550

FRICTION SPRING UNIT

Donald F. Sproul, Chicago, Ill., assignor to James R. Cardwell, Chicago, Ill.

Application February 17, 1939, Serial No. 256,945

13 Claims. (Cl. 267—9)

This invention relates to friction spring units for use in bolster supporting spring assemblies.

One of the objects of the invention is the provision of a new and improved friction spring unit for frictionally resisting the compression of the bolster supporting spring assemblies for trucks for railway cars.

Another object of the invention is the provision of a new and improved friction spring unit that is of such dimensions that it may be substituted for one of the helical springs in a conventional bolster supporting spring assembly.

Another object of the invention is the provision of a new and improved friction spring unit for use in bolster supporting spring assemblies for dampening the vertical vibration of the assembly.

A further object of the invention is the provision of a new and improved friction spring unit having novel means for resisting the compression of the unit.

Another object of the invention is the provision of a new and improved friction spring unit having novel means for frictionally resisting the compression of the unit and at the same time providing for resiliently supporting the car body whether empty, partially or fully loaded.

A still further object of the invention is the provision of a new and improved friction spring unit that is inexpensive to manufacture, easily assembled, that may be readily substituted for one of the helical springs in a conventional bolster supporting spring assembly and that is inexpensive to manufacture and install.

Other and further objects and advantages of the invention will appear from the following description, taken in connection with the accompanying drawings, in which—

Fig. 1 is a side elevation of a railway truck, with parts broken away, and showing the friction spring unit in position therein;

Fig. 2 is a horizontal section of the friction spring unit;

Fig. 3 is a vertical section thereof;

Fig. 4 is a vertical section of the unit at right angles to that shown in Fig. 3;

Fig. 5 is a perspective view of one of the friction rings;

Figs. 6 and 7 are perspective views of the wedge members, respectively;

Fig. 8 is a perspective view of one of the end members; and

Fig. 9 is a vertical section of one of the units showing a modified form of construction.

It is common practice to employ spring assemblies of helical springs between railway car bodies and their supporting trucks. Helical springs have more or less free vibration and under certain conditions, depending on the weight of the car body, the speed of the train, the unevenness of the track or the condition of the wheels, this vibration may become harmonic and build up to a point where great damage may be done as when the harmonic vibration of a loaded car builds up to a point to cause the springs to go solid during the travel of the car thereby resulting in injury to the truck frame.

Furthermore, with the improvement of the roadbeds, the redesigning of the cars, and the like, there has come about a marked increase in the capacity of the cars and the weight of the lading. But the space for the bolster supporting springs is limited and consequently, it is desirable to provide means for assisting the springs in supporting the load so as to economize space.

The present invention seeks to provide means for not only assisting the springs in supporting the load but also to prevent harmonic action thereof during the travel of the car at all speeds and under all conditions.

Referring now to the drawings, the reference character 10 designates a railway truck having a conventional side frame 11 provided with a bolster opening 12 and within which is vertically movable one end of a bolster 13. The bolster 13 is resiliently supported by a spring assembly 14 mounted on a spring plank 15 which in turn rests on the tension member 16 of the side frame as is usual in such constructions. Since the specific details of the construction thus far described is of the conventional type in general use, it is not thought to be necessary to further illustrate or describe the same.

The spring assembly 14 comprises helical springs 17, one of which is shown in Fig. 1. A friction unit or friction spring unit 18 is adapted to be substituted for one or more of the helical springs 17. It is understood that one or more of these units is used on each side of the truck and if the unit is substituted for one of the front springs on one side of the truck, it will be substituted for one of the rear springs on the other side so that the bolster will be properly balanced.

The friction unit 18 comprises the end plates or friction members 19 and 21 which, for convenience of description, will be termed the cap or top plate and the bottom or base plate, respectively. While the plate 19 may be described as the cap plate, it is understood that the unit may be inverted in the spring assembly if desired. Since the top and bottom plates are similar, only the bottom plate need be described.

The unit also comprises one or more intermediate friction members or friction rings 22, two being shown. A pair of friction elements, blocks, or wedge members 23 is mounted between each two of the friction members and horizontally arranged springs 24 are provided, each spring reacting between two oppositely arranged wedges 23. The wedges or wedge members 23 all face radially outwardly. The parts are held in assembled relation by bolts 25, see Fig. 4.

Referring now to Fig. 8 in which one of the end plates is shown, this plate, as shown, is in the form of an annular block 26 having a depressed or hollow central portion 27 which forms the upstanding walls or segments 28 and 29 arranged on the opposite sides of the plate. The plate may, if desired, be provided with an axial opening 31 for the escape of water or the discharge of dust that may accumulate on the plate. The walls 28 and 29 are provided with enlargements or projections 32 extending radially inwardly and each of which is provided with a vertical opening or bore 33 through which extend the bolts 25, as shown in Fig. 4. These openings have counterbores 34 at their outer ends for receiving the head 35 or the nut 36 of the bolt 25. The depths of the counterbores on these plates are such that the bolt will not extend beyond either end of the unit when the latter is compressed to its maximum extent. The counterbores are angular so that they will prevent rotation of the bolts and heads. By compressing the unit to its maximum extent and seating the bolt head on the bottom of the respective counterbore, the bolt will extend sufficiently beyond the unit to permit the nut to be applied. The plate is provided with two oppositely arranged inclined friction surfaces 37 between the wall segments 28 and 29, each of which is a straight planar surface inclined to face inwardly and downwardly. These friction surfaces are arranged between the segments 28 and 29 of the upstanding wall and are of less height than the wall so that the shoulders 38 are formed at each end of each friction surface, as shown more clearly in Fig. 8.

The wedge members 23 are adapted to engage these friction surfaces. The shoulders 38 will prevent endwise movement of the wedges during the operation of the unit. The wedges 23 are duplicates of each other and each comprises a base 39 which is substantially rectangular and having the inclined wedge faces 41 and 42 which converge outwardly. The base 39 is provided with an inwardly extending projection 43 which is adapted to engage within the ends of the spring 24 for positioning said spring.

The intermediate friction plates, members or friction rings 22, each comprises a ring portion 44, Fig. 5, having at opposite sides thereof enlargements 45 which are vertically apertured as at 46 through which the bolts 25 extend. These friction rings are provided with straight planar friction surfaces 47 and 48 on the upper and lower sides of the ring and are in pairs opposite each other. These surfaces, as well as the friction surfaces 37 on the end plates, are substantially rectangular. The friction faces 47 and 48 face upwardly and downwardly, respectively, as well as inwardly and are in vertical alinement similar to the friction faces 37 on the end plate 21.

These friction surfaces 47 and 48 are formed by removing portions of the ring thereby forming the shoulders 50 and 60 which guide the wedge blocks engaging the same.

When the parts are assembled as shown in Figs. 3 and 4, the friction plates and rings are in vertical alinement with the friction faces at each side of the unit, one above the other, respectively. The wedge members, blocks or elements 23 engage the friction surfaces on the plates and rings and are forced radially outwardly between the friction rings or between the plates and adjacent rings, by the springs 24, as clearly shown in Fig. 3. As the unit is compressed, the wedge members 23 are forced inwardly toward each other against the compression of the engaging spring and the resistance of these springs to the inward movement of the wedges augments the friction as the unit is compressed. Upon the release of the unit, the springs will force the wedges outwardly between the rings and plates causing the parts of the unit to resume normal expanded position, as is shown in Figs. 3 and 4.

In the transportation of freight on railway cars, the weight of the lading will vary greatly. Furthermore, the cars are often only partly loaded so that the weight of the same will be very materially below that of its capacity. It is desirable that means be provided whereby empty cars or partly loaded cars will be as resiliently supported as if they were loaded.

In the form of the construction selected to illustrate one embodiment of the invention, this is accomplished by providing a friction unit having portions thereof with different frictional resistances to its compression. One means of accomplishing this is shown in Fig. 9 and consists of the employment of springs of different capacities inserted between the wedge members. As shown, the springs 24a, 24b and 24c are employed between the wedges. These springs all have the same internal diameter so that they will have different capacities. The spring 24a is of the one size and one or more of the other springs is formed from wires of smaller diameter. As shown in Fig. 9, the three springs are each of different capacity but it is understood that they may be otherwise.

In the operation of the form of the device shown in Fig. 9, when the unit is compressed, the wedges 23 forced outwardly by the lighter springs 24c, will be forced inwardly against the compression of the springs 24c before the other wedges begin to move or at least before they have moved to an appreciable extent. In this way, it will be seen that the lighter springs being more easily compressed, will permit the compression of the unit so that the lighter load may be resiliently supported by the spring assembly. With heavier loads, the lower friction ring 22 in Fig. 9 will ride directly on the plate 21 and the vertical movement or vibration of the unit will take place between the upper friction rings and upper plate 19 until with the continued increase in load the intermediate friction rings 22 engage. On further increase of the load, the movement is between the upper plate 19 and the adjacent friction ring 22. In this way, loads of different weights will be properly resiliently supported. While in the construction shown, the springs are of gradually increasing capacity from the lowermost toward the top, it is understood that the unit may be reversed and that the springs may have any two of the same capacity, if desired.

In both forms of the device, the parts are so constructed that the friction rings 22 will engage before the springs go solid, thereby protecting the springs against distortion by over-compression.

When the rings 22 engage each other, a very solid column is provided for receiving severe shocks and for preventing the helicals of the bolster supporting spring assembly from being over-compressed. The enlargements or projections 32 and 45 materially assist in forming a rigid, sturdy column when the friction rings are forced into interengagement.

In the form of construction shown in Fig. 9, the two lower rings will close before the others because of the lighter springs between the lower wedges. The remaining friction rings will close progressively due to the progressively increasing strength of the springs.

While the top and bottom friction plate members are shown as being circular in horizontal section, and are duplicates, it is understood that the same may be angular or other form. For the purpose of disclosure, the units are shown as being circular in cross-section and are preferably so constructed so that they can easily be substituted for one or more of the conventional inner or outer helical springs, as the case may be, in a conventional bolster supporting spring assembly.

It is thought from the foregoing, taken in connection with the accompanying drawings, that the construction and operation of my device will be apparent to those skilled in the art and that changes in size, shape, proportion and details of construction may be made without departing from the spirit and scope of the appended claims.

I claim as my invention:

1. A bolster supporting unit for use in spring assemblies comprising a pair of end plates, a plurality of annular friction members between said plates and having a common axis, each of said plates and members having planar wedging faces, oppositely arranged wedge members engaging said friction faces, and means for resiliently forcing said wedges radially outwardly into engagement with said wedging faces.

2. A friction unit for use in spring assemblies comprising a plurality of annular friction members having a common axis, friction faces on said annular members, wedge members provided with planar wedging faces engaging said friction faces, and bolts extending through said annular members at opposite sides thereof for limiting the axial movement of said annular members.

3. In a bolster supporting unit, top and bottom friction plate members, an intermediate friction ring member, said members having their adjacent faces at opposite sides thereof provided with inclined friction surfaces, wedge blocks engaging adjacent friction surfaces, and springs for normally forcing said wedge blocks apart for expanding said unit.

4. In a friction spring unit, a base member comprising a plate having a central depression in its upper surface forming upstanding wall segments at opposite sides of the plate, friction surfaces between said segments at the opposite sides of the plate of less height than said segments, said surfaces extending upwardly and radially outwardly, and enlargements on said segments having vertical openings therethrough for the reception of bolts.

5. In a friction spring unit, an upper friction member, a lower friction member, at least one annular intermediate friction member between said upper and lower friction members, said members all having inclined friction surfaces on their adjacent faces, the friction surfaces of adjacent members being arranged in pairs opposite each other, the friction surfaces of each pair converging outwardly, wedge elements between said members for engaging said friction surfaces, said wedge elements each having outwardly converging wedging faces engaging the adjacent outwardly converging faces of said friction members, resilient means directly engaging said wedge elements for forcing the same radially outwardly for causing said wedge elements to frictionally resist the compression of said unit, and means extending transversely of the resilient means for limiting the expansion of said unit.

6. In a friction spring unit, an annular base plate, an annular cap plate, one or more intermediate plates, each of said plates having inclined friction surfaces, wedge members engaging said surfaces, said wedges and plates being alternately arranged from the bottom of the unit to the top, and springs for resisting the movement of said wedge members when said unit is compressed, said unit having a cylindrical exterior of substantially the same dimensions as a conventional railway bolster supporting spring.

7. In a friction spring unit, a plurality of friction plates and wedge means alternately arranged, said members and means having cooperating wedging faces in engagement, horizontally arranged springs for resisting the radial inward movement of said means, and means for holding the parts in assembled relation, the length of said springs being such that said annular plates will engage each other before said springs go solid upon the compression of said gear.

8. In a friction spring unit, an annular top friction plate, an annular bottom friction plate, one or more intermediate annular friction plates, wedge members arranged in pairs having their apices pointing radially outwardly, alternating with said friction plates, and a horizontally arranged spring between each pair of wedge elements for resisting the movement of said elements inwardly.

9. In a friction spring unit, a top friction plate, a bottom friction plate, one or more intermediate friction plates, each of said plates having inclined friction surfaces depressed in the surfaces of said plates and forming shoulders at each side of the friction surfaces, wedge elements arranged in pairs engaging said depressed friction surfaces, a horizontally arranged spring between each pair of wedge elements for resisting the inward movement of said elements when said unit is compressed, and bolts extending through said plates and having their heads and nuts engaging in counterbores in the top and bottom friction plates.

10. In a friction spring unit, a top friction plate, a bottom friction plate, one or more intermediate friction plates, wedge members arranged in pairs having their apices pointing radially outwardly, alternating with said friction plates, and a horizontally arranged spring between each pair of wedge elements for resisting the movement of said elements inwardly, said springs being of different capacities.

11. In a friction spring unit, a plurality of plate members having inclined friction surfaces on their adjacent faces, wedge members engaging said surfaces for normally holding said plate members apart, and springs for yieldingly resisting the inward movement of said wedges when said unit is compressed, said springs increasing progressively in capacity from one end of the unit toward the other.

12. In a bolster supporting unit, top and bottom friction plate members, an intermediate friction ring member, said members having their adjacent faces at opposite sides thereof provided with inclined friction surfaces, wedge blocks engaging adjacent friction surfaces, and springs of different capacities for normally forcing said wedge blocks apart for expanding said unit.

13. A friction unit for use in spring assemblies comprising a plurality of annular friction members having a common axis, friction faces on said annular members, wedge members provided with planar wedging faces engaging said friction faces, and bolts extending through said annular members at opposite sides thereof for limiting the axial movement of said annular members, the heads and nuts of said bolts seating in angular counterbores for preventing rotation of the heads and nuts.

DONALD F. SPROUL.